United States Patent
McMonagle et al.

(10) Patent No.: US 8,296,236 B2
(45) Date of Patent: *Oct. 23, 2012

(54) CENTRALIZED CHECK IMAGE STORAGE SYSTEM

(75) Inventors: Patrick S. McMonagle, Niwot, CO (US); Douglas G. Smith, Greer, SC (US); Richard L. Norman, Dallas, TX (US)

(73) Assignee: Viewpointe Archive Services, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/118,894

(22) Filed: May 31, 2011

(65) Prior Publication Data

US 2011/0231295 A1  Sep. 22, 2011

Related U.S. Application Data

(63) Continuation of application No. 10/711,550, filed on Sep. 24, 2004, now Pat. No. 7,979,352.

(60) Provisional application No. 60/481,419, filed on Sep. 25, 2003.

(51) Int. Cl.
*G06Q 40/00* (2006.01)
(52) U.S. Cl. .............. 705/45; 705/35; 705/40; 705/42
(58) Field of Classification Search .............. 705/45; 405/35–45
See application file for complete search history.

(56) References Cited

U.S. PATENT DOCUMENTS 5,784,610 A * 7/1998 Copeland et al. ................. 1/1
2003/0208421 A1* 11/2003 Vicknair et al. ............... 705/35

FOREIGN PATENT DOCUMENTS

WO  03060797 A1  7/2003

OTHER PUBLICATIONS

Viewpointe Archive Services, LLC, Canadian Intellectual Property Office, Application No. 2,479,033, Office Action dated Feb. 1, 2011, 6 pages.

* cited by examiner

*Primary Examiner* — Lindsay M Maguire
*Assistant Examiner* — Hao Fu
(74) *Attorney, Agent, or Firm* — Steven B. Phillips; Moore & Van Allen PLLC

(57) ABSTRACT

Centralized check image storage system. The present invention provides for sharing check images stored in a substantially centralized storage system between and/or among banks in support of the check collection process. In some embodiments, check images are received from the capture bank via a landing zone at the centralized storage facility. These images and information supporting the check collection process can be in the form of load file. A cross-reference file including information supporting the check clearing process such as unique handles identifying the check images is received from a paying bank, possibly also via a landing zone. Check images can be identified based on these unique handles, so that the check images can be made accessible to both the capture bank and the paying bank from the substantially centralized storage system.

41 Claims, 8 Drawing Sheets

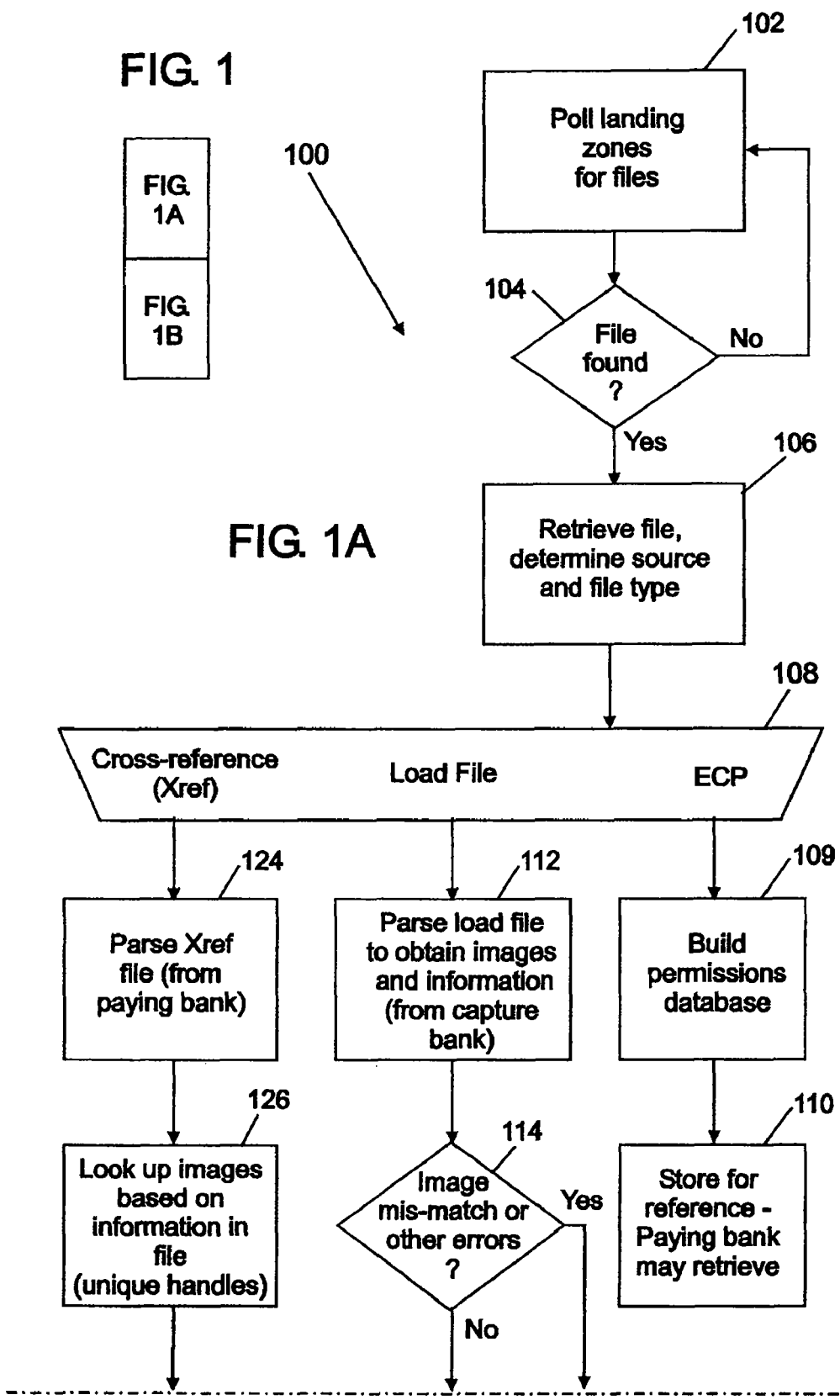

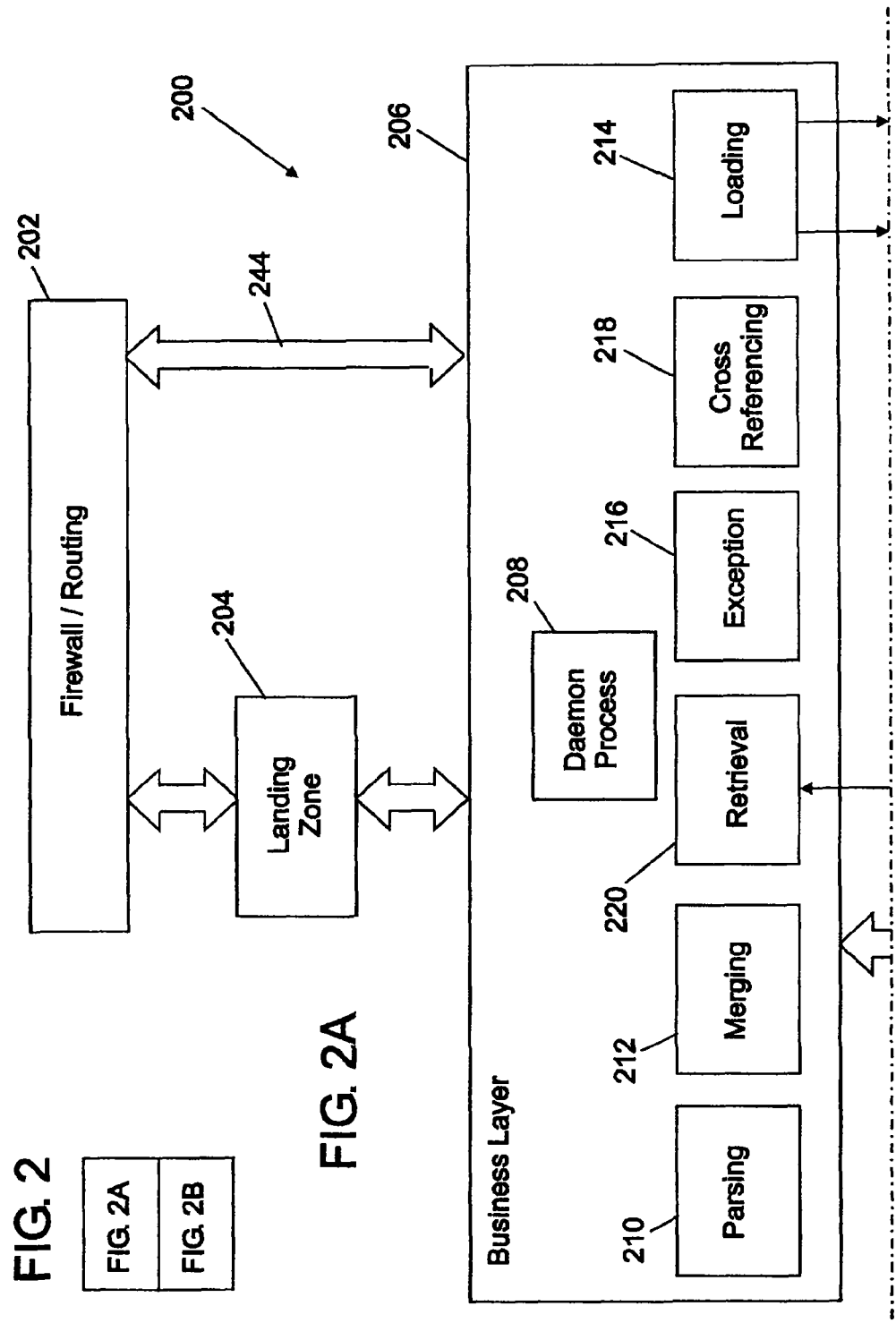

CENTRALIZED CHECK IMAGE STORAGE SYSTEM

CROSS-REFERENCE TO RELATED APPLICATION

This application is a continuation of and claims priority from commonly owned, copending application Ser. No. 10/711,550, filed Sep. 24, 2004, entitled, "Centralized Check Image Storage System," which in turn claims priority from co-pending provisional patent application Ser. No. 60/481,419, filed Sep. 25, 2003, and the entire disclosures of both of these prior applications are incorporated herein by reference.

BACKGROUND

Financial institutions have established various associations and processing relationships under a set of mutually agreed to methods, processes and time limitations that are directly related to the exchange of documents evidencing monetary transactions. These transactions are generally referred to as magnetic ink character recognition (MICR) debits and credits. These documents are in the form of checks, deposits, drafts, and adjustments and are theoretically presented by delivery of a physical document. For purposes of discussion herein, any such documents may be referred to as "checks." This practice has been in effect for many years. There is a well-defined and well-known process within the banking system of the United States and within the systems of other countries that supports the exchange of these items. This process is known as the check clearing process or check clearing system. This process begins with the presentation of a MICR document to a financial institution. Financial institutions must present millions of these items each day within their own franchise as well as to other financial institutions. Presentment can be accomplished through clearing house arrangements.

As consumer demand for expedited funds availability and faster settlement of accounts has grown, and legislation has been passed to accommodate this consumer demand, methods have been created to allow earlier posting of checks to drawer accounts at a paying bank. These methods most typically involve the advance presentment of a "cash letter" from a depositary bank to a paying bank, the cash letter containing MICR data read from checks. Settlement occurs based on the cash letter, but reconciliation with paper checks is still required once the paper checks have been presented. Additionally, both banks typically keep either physical or electronic copies of checks for archival purposes.

The shipment of cash letters must meet rigid time schedules that can be impacted by bad weather, traffic problems or emergency situations. As a result, the requirement that the cash letter be a physical document has, at least between some banks, been eliminated and an electronic cash presentment (ECP) file is used. ECP files are formatted according to accepted industry standards. Either paper cash letters or electronic cash presentment files can be sent directly between financial institutions, but more often, they are sent through clearing agents.

Reconciliation processes based on the paper checks are subject to numerous exceptions as a result of paper handling and due to late delivery of work and work not being received. Additionally, each bank maintains its own redundant copies of checks for archival purposes. Some banks maintain these copies only in physical (paper or microfiche) form, others maintain them in electronic image form, and others maintain both. Additionally, some banks contract out their check archiving to a archiving services vendor, but each bank still maintains an independent archive.

SUMMARY OF INVENTION

The present invention, in example embodiments, provides for sharing check images stored in a substantially centralized storage system between and/or among banks involved in the transactions to which the checks are related. The invention can be used to eliminate the physical shipment of checks between depositary and paying banks, to speed reconciliation, and to reduce on-site image archive storage needs of banks.

In some embodiments, a method of centralizing check images for access by both a capture bank and a paying bank includes receiving check images and index information from the capture bank. The capture bank is typically a depositary bank. These images and information can be in the form of a load file, for example, a common import format file (CIFF) or an indexing reference file. The index information includes unique handles identifying the check images, and can include additional information supporting check collection and the check clearing process. The check images can be stored in the centralized storage system. A cross-reference file comprising information to support and/or enable check collection as part of a check clearing process, including the unique handles identifying the check images, is received from the paying bank. Check images can be identified through use of the cross-reference file based at least in part on these unique handles, so that the check images can be rendered to the paying bank. Thus, the check images are accessible by at least two banks, typically, the capture bank and the paying bank, from a substantially centralized storage system based on, or using information supporting check collection which has been acquired from one of or both of the banks. In some example embodiments, electronic cash presentment files can also be received from the capture bank and centrally stored so that the paying bank can access an electronic cash presentment information. The electronic cash presentment file can also be used to create a permissions database for verifying the accessibility of the images by the paying bank based on the cross-reference file.

In some embodiments, a first storage area in the centralized system is used by the capture bank, and a second storage area is used by the paying bank. In some embodiments, the images are stored in different formats in the two storage areas. However, in some embodiments a centralized storage system can store one copy of an image for use by two or more banks. The unique handles, in some embodiments, can be check image management system (CIMS) keys.

In example embodiments, a computer program product that includes computer program instructions or computer program code can implement at least portions of the invention. These computer program code instructions can be embodied in computer usable media or transferred over a network, and control the operation of various servers, routers, network connections, and data stores and associated storage hardware to provide the means to carry out the invention. In example embodiments, the computer program instructions control the operation of a system that can include a landing zone operable to receive the check images and index information. A storage layer is present in some embodiments and is operable to store at least the check images and the unique handles and to manage any required databases. These databases can include an image interchange database, a profiling database, and a permissions database. A daemon process can be operatively connected to the landing zone, and can identify files in the landing zone and instantiate parsing processes. In some embodiments, a matching component identifies and merges the check images based on the unique handles and possibly also on other information related to the check collection and clearing process. A loading process can load the check images into the storage layer. In example embodiments, a cross-reference file is used to identify images to be shared between the banks. The cross-reference file includes at least one index detail record, which can further include a cross-reference return code and a unique handle for an image. The cross-reference file can also include header and trailer records, and an index definition record.

BRIEF DESCRIPTION OF DRAWINGS

FIG. 1 is split across FIGS. 1A and 1B for clarity.

FIG. 2 is split across FIGS. 2A and 2B for clarity.

DETAILED DESCRIPTION

Figure 1B:
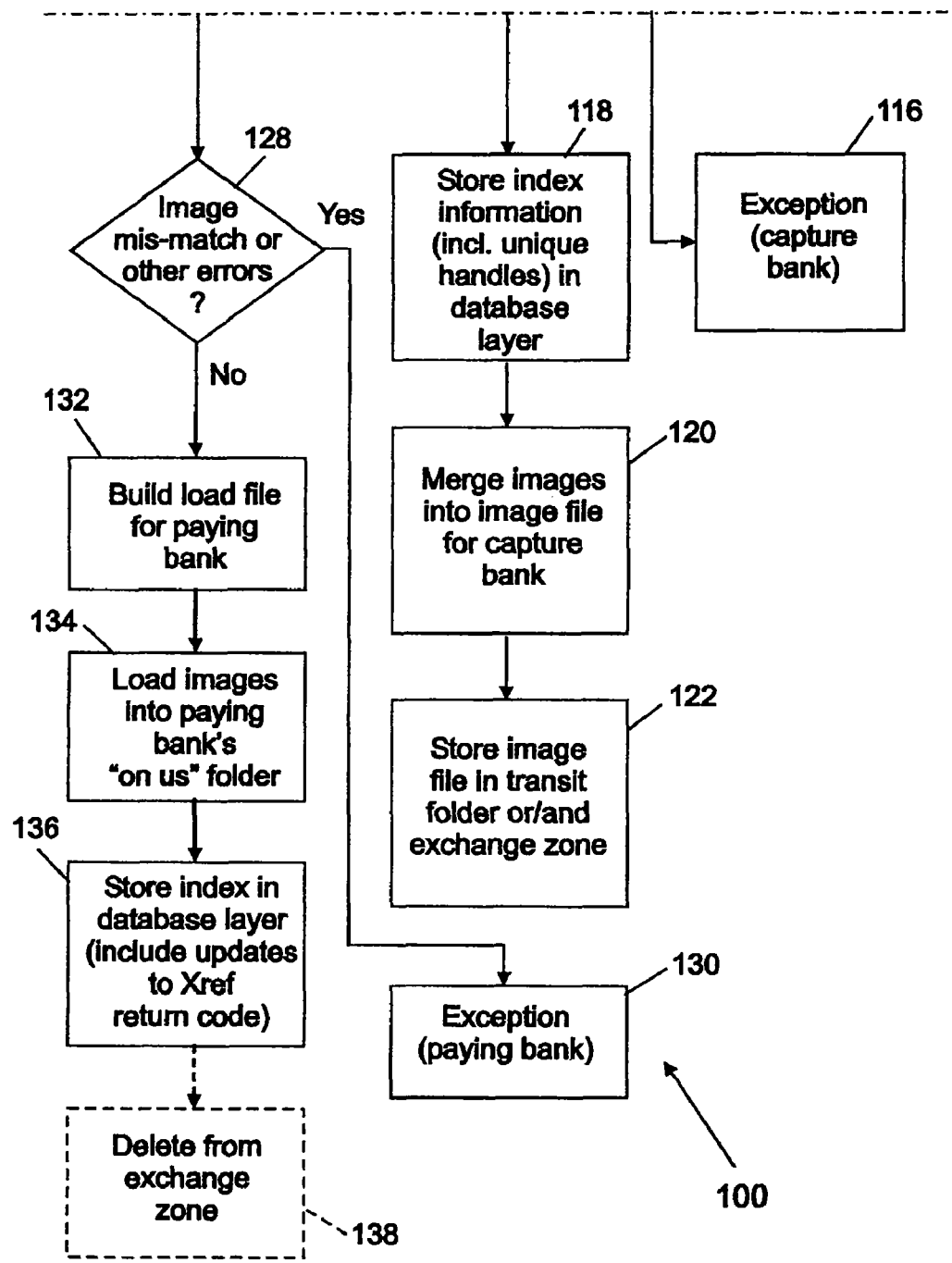
FIG. 1 is a flowchart which illustrates methods according to example embodiments of the invention.

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, the steps of the method may be performed in any order or simultaneously, unless it is clear from the context that one step depends on another being performed first.

At least some of the drawings, which are used to illustrate the inventive concepts, are not mutually exclusive. Rather, each one has been tailored to illustrate a specific concept or concepts being discussed. In at least some cases, the elements or steps shown in a particular drawing can co-exist with others shown in a different drawing, but only certain elements or steps are shown in each drawing for clarity. In some cases, additional elements or steps are discussed in detail in the text to more fully describe embodiments of the invention. It should also be understood that with respect to flowcharts, block diagrams, and data structures, not every possible signal flow, data path, or index element is shown. Rather, for clarity, only those important to the inventive concepts being discussed may be illustrated, although others may be discussed in this description.

The meaning of certain terms as used generally in the context of this disclosure should be understood as follows. The term "check" can refer to any document evidencing a financial transaction. In this context, a "check" includes the typical draft, which orders a bank to pay a certain sum to the order of another individual or entity. Indeed, this is what is commonly thought of as a "check" by consumers and business persons alike. However, the term "check" can also include other documents evidencing financial transactions related to banking. For example, in the context of this disclosure, a deposit, adjustment, or similar document that evidences change to an account can also be thought of and referred to as a "check."

The terms "capture bank" and "paying bank" as used herein refer to the two banks that are typically involved in financial transactions, for example, the processing of checks. The "capture bank" is typically the bank that first captures an image of a completed check. In most cases, this is the bank where a check is deposited for payment, and might also be referred to in traditional commercial paper parlance as the "depositary bank." The "paying bank" is the bank that owns the account to which the check pertains, in the case of a draft, typically, the bank in which the funds to pay the draft reside. This is typically the bank where a check writer has an account. However, the invention can be applied between any financial institutions that desire to share images captured by one of the institutions. Information is exchanged that supports the check clearing process, so that the institutions can, if they so desire, implement an electronic check collection or clearing process and truncate paper checks, although check truncation is not required to implement the invention. Thus, the terms "capture bank" and "paying bank" are used herein only in the context of example embodiments. Note that even the term "bank" is used herein in its broadest sense. Financial institutions that process transactions of the type discussed can include stock brokerages and other types of institutions that are not strictly "banks" in the historical sense. The use of the term "bank" herein is meant to encompass such possibilities.

In traditional banking, a draft type of check is presented to the paying bank for payment. It should be noted that in some circumstances, the capture bank and the paying bank might be the same bank. For example, the check process might be carried out between different branches, divisions, facilities, etc., of the same financial institution. The terms paying bank and capture bank are intended to encompass this possibility.

At various places throughout this disclosure, reference is made to the term "unique handle" in discussing index records and various types of files. The term "unique handle" is meant to refer to a value stored in an index record which uniquely identifies an electronic image of a check. Thus, the term "unique" is not meant to imply that the value is unique throughout the world, or even in a given system, but merely that the value is unique enough to specifically identify an electronic image from among the images stored in the same file, data store, or whatever environment it is necessary to be able to determine which image is which. The term "handle" is simply meant to refer to a value which allows a computing system to specifically identify and retrieve an image from an electronic file.

The term "render" and its variants such as "rendering" are intended to encompass various accepted definitions of the term, both within and outside the imaging art. The term encompasses the meaning "to make available to" or "to provide" and thus, is meant to refer to making a file or images available to a party such as one of the banks. However, the term may also encompass the imaging meaning as in to produce or "render" an image. In some embodiments of the invention, images are made available to different banks by creating a copy of the image in storage for each bank. However, in other embodiments, a single image can be used by multiple banks. Thus, in this later case, the term "render" simply refers to the act of making an image available through computerized means. The term "render" can also mean to "present" as in to present items for collection to a bank, since if the invention is used to enable check truncation, presentment takes place by way of rendering a check image to a paying bank. The term "substantially centralized" refers to a storage system or archive from which images are rendered or made available to banks as necessary. By use of the term "substantially" the disclosure is meant to encompass the possibility that multiple physical locations may be used in conjunction to provide images to banks. Thus, the term "substantially centralized" simply means that images are stored at a location or a plurality of related locations to be accessed by multiple banks.

There are several file formats and file formatting standards discussed throughout this disclosure. These file types, with the exception of the "cross-reference file," are intended to refer to industry standards that are well known in the banking technology arts. Thus, detailed explanations are not required. The "binary large object" (BLOB) format is a known format for storing large numbers of images together in a single file. The "mixed object document content architecture" (MOD-CA, or simply "MODCA") is a standard file format which was originally developed by and used for data processing systems produced by the International Business Machines Corporation. This format has been used for years to provide data to large scale printers, and a publication describing the standard can be obtained from the IBM Corporation by ordering IBM Publication SC31-6802-05, *Mixed Object Document Content Architecture Reference*, April, 2001. With MODCA format, image information is stored in an "out file" and information to identify the imaging information is stored in an "index file". This format has been well known in the information technology industry and will not be discussed in a high level of detail.

Additional references herein are made to well known, financial industry technologies. "Check image export" (CIE) refers to a system and file formats for imaging checks and tracking the images. With CIE, check images and index information referring to the check images can be stored in a single file, commonly referred to as a "common import format file" (CIFF) data set. CIE has been used for many years by many banks to archive check images for their own internal use. As previously mentioned, sometimes this archiving is provided by a contractor.

CIE data sets can be managed by a type of data processing system, which is well known, and is commonly referred to as a "check image management system" (CIMS). CIMS provides for the management of repositories for images within a bank. CIMS was created by the International Business Machines Corporation to manage and output CIE information and CIFF files. Images can be referred to in a CIMS system by a "CIMS key" which tags an image with the date on which the image was scanned and a sequence number assigned by the scanner. CIE and CIMS are designed to incorporate MICR data into index records for check images. Again, these systems have been used for many years by banks to archive checks for their own purposes, are well known, and thus will not be discussed in great detail.

References are also made herein to an "indexing reference file." An indexing reference file is a file type specified by IBM for use in their OnDemand(product, which is discussed in greater detail at the end of the description of FIG. 2 of this disclosure. The indexing reference file format is well-known to those of skill in the banking information technology arts, but more information about it can be found in the IBM publication, *Content Manager OnDemand for Multiplatforms, Indexing Reference*, Version 7.1, IBM Publication Number SC27-0842-00, March 2001.

It should be understood that these file formats and image standards are disclosed by way of example embodiments of the invention. One of ordinary skill in the art could readily develop a system based on different standards and formats, but that would not depart from the spirit and scope of the claims appended to this disclosure.

FIG. 1 is a flowchart which illustrates methods and processes according to some embodiments of the present invention. FIG. 1 is split across FIGS. 1A and 1B for clarity. FIG. 1, in typical flowchart form, shows flowchart 100 as including various process blocks. At block 102, landing zones for various banks are polled for files. A landing zone is an area of storage, typically behind a firewall, into which a bank or financial institution can deposit a file for processing by a storage system according to the invention. In some embodiments, a bank's landing zone can be used for the bank to pick up files as well. Additional detail on implementing landing zones will be discussed below. At block 104, processing branches when a file is found. Until a file is found, processing continues with polling of the landing zones. When a file is found, processing moves to block 106, where the file is retrieved, the source is determined, and a file type is determined.

Block 108 represents a decision point where the type of processing that occurs depends on the type of file found. If the file found is an ECP file, it is used to create a permissions database at block 109. It may be then stored for reference at block 110. The ECP file may also be retrieved by the paying bank, so that the paying bank can ascertain handles and other information from the capture bank which will then be used to create a cross-reference file as discussed below. Optionally, a capture bank can forward an ECP file directly to the paying bank, or provide it through an agent or contractor. Thus, the storage of the ECP file for the paying bank in the system implementing the invention is not necessarily required.

As previously mentioned the ECP file provided by the capture bank can also be used to develop a permissions database at block 109. Upon receipt of the cross-reference file from the paying bank, each item referenced in the cross-reference should be found in the permissions database to be included in the items made accessible to the paying bank. Any exceptions can be reported to the paying bank as part of the error reporting process.

If the file is found to be a capture bank "load file" at decision block 108, it will normally contain images and information from a capture bank. The capture bank load file is parsed at block 112 to obtain the images and the information at least some of which can support the check collection/clearing process. A determination is made at block 114 as to whether the file has errors. This determination involves verifying the index information with the images present. Images that are missing, corrupt, or misidentified, are repaired at exception process block 116. The exception process can involve communicating with the capture bank to correct the information in the capture bank load file. If necessary, the capture bank can correct the errors and regenerate the load file. Once a load file with no errors has been retrieved and parsed, index information, including unique handles identifying the images, and possibly other information supporting the check clearing process, is stored in a database layer at block 118. A load file can be any file that stores both images and information about the images. In one embodiment, a CIFF file as previously discussed can be used. In another embodiment, an indexing reference file can be used.

In the example embodiment of FIG. 1, the images can be merged into a single BLOB file or a number of BLOB files for storage in a storage layer in the substantially centralized storage system. The images are merged at block 120. In this embodiment, the index and other information can be stored in a database, which operates on conventional database principles. For purposes of this disclosure, this database is referred to as the "image interchange" or II database. In the illustrated embodiments, the images are stored for the capture bank at block 122. In at least some embodiments, images can be stored in a BLOB format in a "transit folder" which is assigned to the capture bank. In other embodiments, images can be stored in a exchange zone for some period of time.

Returning to decision point 108 in FIG. 1, a file retrieved from the landing zone may be a cross-reference (Xref) file, which is received from a paying bank. It should be noted that although the cross-reference file would typically be received after the load file is received from the capture bank, the cross-reference file can be received in advance of the capture bank load file, and stored until the capture bank load file is received. The cross-reference file includes information used to identify the specific images intended for the paying bank. It can also contain additional information supporting the check collection and clearing process, such as paying bank specific index data, which would typically also be included in the capture bank load file and/or the ECP file by agreement between the banks. Thus, the centralized storage system acquires information used in the check collection or clearance process from at least one, but typically from both of the banks. The cross-reference file is parsed at block 124. Images are looked up in the database layer based on their unique handles at block 126. As part of this look-up process, information in the cross-reference file is checked by a matching process against information in the permissions database to verify the accessibility of the check images to the paying bank. This look-up also involves accessing index information in the II database. A determination is made at block 128 as to whether there is an image mismatch, permissions error, or other errors. If errors are found, an exception process is initiated at block 130. This exception process again may involve communication with the paying bank, to have the cross-reference file regenerated, or the cross-reference file can be corrected locally by reference to the load file, index information, or an ECP file.

With some embodiments, once a correct cross-reference file has been received, it is used to build a load file for the paying bank at block 132 of FIG. 1. A copy of the images specifically for the paying bank is then loaded into an "on us" folder in the storage layer at block 134. Index information in the II database is updated at block 136. In this example embodiment, this update includes the writing of an Xref return code into a copy of the cross-reference file which is maintained in the II database. It should be noted that steps in processing a cross-reference file as illustrated in FIG. 1 are specific to certain embodiments of the invention. In other embodiments, separate images for the paying bank and the capture bank may not be maintained. Rather, index information can be organized such that the capture bank's images are loaded into a exchange zone, then into the on us folder so that eventually each bank can access the same images from the on us folder. In such a case, both banks access a single image of each item, but a separate index is maintained for each bank. Also in such a case, images are eventually deleted from the exchange zone at block 138. In any case, once the process is complete, images are rendered to the paying bank for reconciliation, and are kept in a centralized archive for access by both the paying bank and the capture bank. Thus, check images are accessible by both the capture bank and the paying bank from a substantially centralized storage system. As previously discussed, an electronic cash presentment file representing the transactions covered by the images can also be stored and made accessible to the banks.

As previously mentioned, in one example embodiment shown in the drawings, the capture bank's copy of the images is stored in a BLOB file, and the paying bank's copy of the images is stored in MODCA format. Each bank's images are stored in a bank's own storage area, thus there is a first storage area and a second storage area contained within the storage layer. As previously discussed, these specifics are not required to implement the invention, but are presented as details of example embodiments. As an alternative to MODCA, tagged image file format (TIFF) wrappers can also be used to load and store images.

Figure 2B:
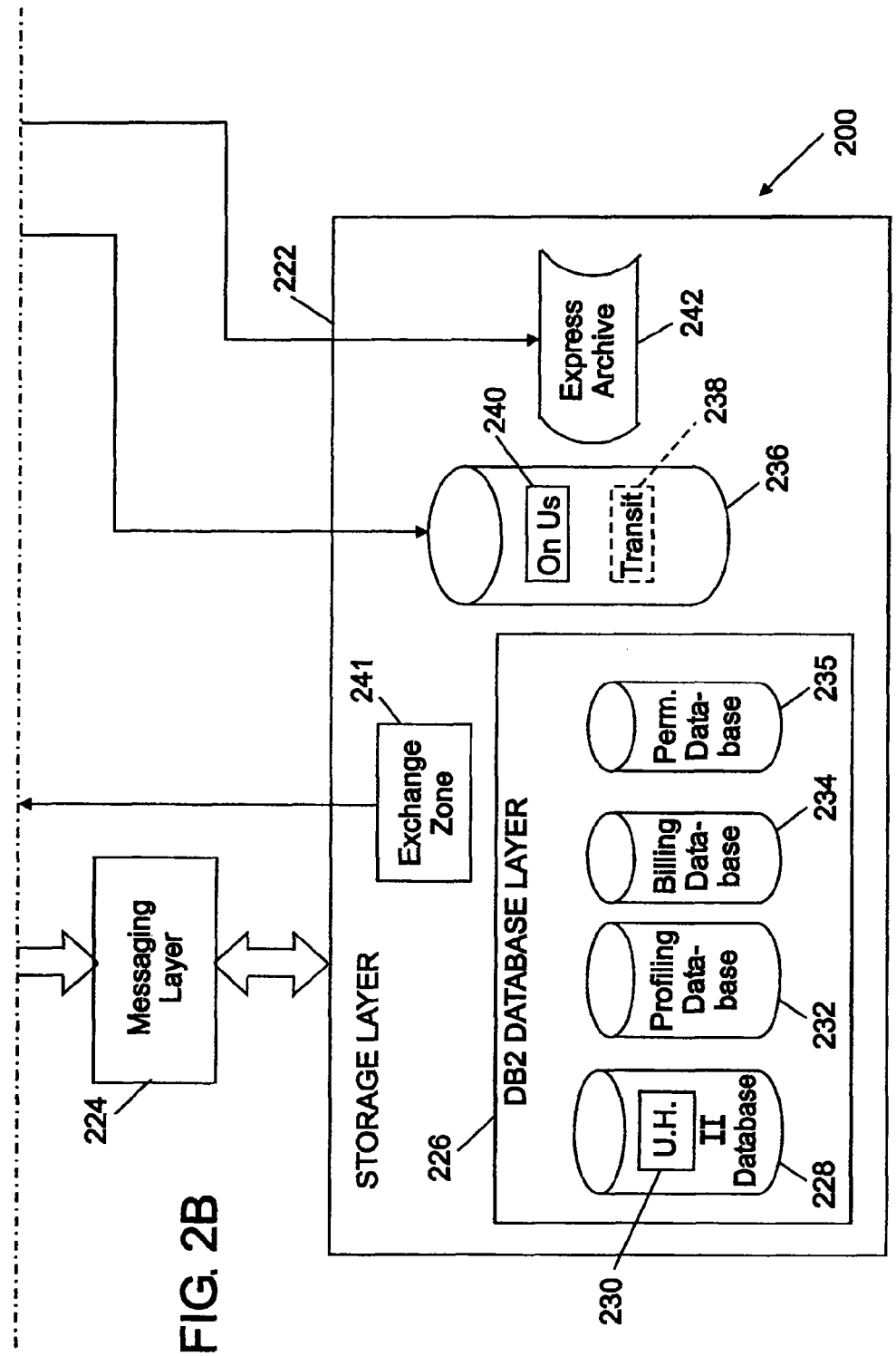
FIG. 2 is a software system block diagram illustrating components involved carrying out certain embodiments of the invention.

FIG. 2 is a block diagram of a system, 200, which can be used to implement the centralized storage system required in at least some embodiments of the process described in FIG. 1. FIG. 2 is split across FIGS. 2A and 2B for clarity. In system 200, all of the various parts of the system are located behind a firewall and routing functions, shown at block 202. In example embodiments, routing is conducted over the Internet. More specifically, connections to paying and capture banks are made over "virtual private network" (VPN) facilities, including typical encryption routines as are known in the art. VPN processing is well known to those of skill in the data processing arts, and so will not be discussed in great detail. Block 204 is a landing zone onto which, or into which, banks may deposit files for processing. It is also possible to have a file placed in landing zone 204 by the centralized storage system for pickup by a bank. The landing zone can be implemented by secure file transfer protocol (FTP). In example embodiments, the landing zone can be implemented by a known product called Connect:Direct(, a file-based integration software solution available from Sterling Commerce, Inc., as of this writing, of Dublin, Ohio. Connect:Direct provides a way in which secured access can be obtained by authorized parties to storage space behind a firewall.

In the example of FIG. 2, business layer 206 performs various services involved with implementing core functionality of system 200. Daemon process 208 polls landing zone 204 for the various file types. Daemon process 208 invokes parsing processes 210, which are used to parse the various files. Parsing processes 210 can call merging component 212 to verify image details and direct loading process 214 to load images into a storage layer, 222. Business layer 206 also includes an exception process, 216, cross-referencing process 218, and an image retrieval process 220.

System 200 of FIG. 2 includes messaging layer 224. The messaging layer helps all of the other modules, processes, and objects in the system communicate with each other. Messaging layer 224 can also temporarily store event and status information. In some embodiments, every other module and process in a system can send notification messages through a messaging layer to other components within the system.

Storage layer 222 has been previously mentioned. In this embodiment, storage layer 222 includes database layer 226. Database layer 226 can include various databases. In this example, it includes the information interchange (II) database 228. This database contains index information for the images, and a copy of the cross-reference file, including unique handles 230 which are used to identify the images so that they can be used by both a capture bank and a paying bank. Database layer 226 can also include a profiling database, 232. Profiling database 232 defines specific operating parameters for a bank. These parameters can include the specific index data values provided by the paying bank, used to determine how to parse the cross-reference file and how to build a paying bank specific index for loading of the data. Other profiling data can also be contained in the profiling database to define how the archives, discussed below, operate when errors are detected, the location of landing zones and work areas, and the specifics for loading data into folders for the paying banks, as described below.

In this example, database layer 226 also includes a billing database, 234, and the permissions database, 235. Permissions database 235 has been previously discussed. In this example embodiment, the permissions database, 235, can be erased once the cross-reference file has been processed and the images are made available to the paying bank. The billing database, 234, is used to maintain information by which customer banks can be billed for image sharing services. In this example, database layer 226 can be implemented using "DB2" database technology, which is well known to those of ordinary skill in the data processing arts.

Storage layer 222, in the example of FIG. 2, includes an "OnDemand" archive, 236. "OnDemand" refers to a well-known archiving solution available from the IBM Corporation referred to as Content Management OnDemand(. The OnDemand archive, 236, can include a transit folder, 238, an "on us" folder, 240, and a exchange zone, 241. In one embodiment, transit folder 238 is a first storage area which includes images for the capture bank in BLOB format, and on us folder 240 is a second storage area which includes images for the paying bank in MODCA format. In other embodiments, one copy of the images can be included in OnDemand archive 236 and accessed by both banks. In addition to MODCA and BLOB, other file formats can be used, for example, TIFF wrappers. In a particular embodiment illustrated in FIG. 3, discussed below, images in on us folder 240 are eventually used by both banks, with exchange zone 241 serving as temporary storage for the capture bank, and no transit folder is used. In still other embodiments, different file formats can be used. Note that in this example, loading process 214 loads the images into the OnDemand archive 236. Note also that in the illustrated embodiment, loading process 214 also loads images into express archive 242. In this example OnDemand archive 236 operates as both the short term and long term archive. The express archive, 242, is used to meet high-speed retrieval requirements. Express archive 242 is a redundant archive to the OnDemand archive. If the cross-reference file delivered by the paying bank contains an express archive indicator, following the loading of an image to on us folder 240 the same image is loaded to express archive 242. Express archive 242 is used for production of optical or other removable media and image statements.

Notwithstanding the fact that OnDemand is well-known in the art, it may be helpful for the reader to have some additional understanding of the way the term "folders" is used in the context of this description. In OnDemand the concept of a folder is a logical representation of the data in the archive. The physical storage of the indexes and image data is controlled by an application group. For example, an application group defines the columns in the database index, the retention period on disk, and the retention period on long term (for example, tape) media. For every bank there will typically be at least one on us application group. In at least some embodiments, at least some banks will also have a transit application group. A bank can direct that its on us data be split into more than one application group to provide additional levels of service. For example, a bank may wish that images pertaining to private banking accounts be stored on disk for 365 days, and images pertaining to normal accounts be stored on disk for 60 days. The logical concept of a folder maps to one or more application groups. For example, the transit folder maps to the transit application group. The on us folder maps to one or more on us application groups. A folder for "all items" can map to both the transit and on us application groups.

As previously mentioned, the Daemon process 208 of FIG. 2 polls for and locates files in landing zone 204. After a file is located, it is moved to a processing area and the Daemon process, 208, initiates an appropriate parser which runs as part of parsing processes 210. After parsing, necessary file details are inserted into II database 228 in database layer 226. An ECP file is parsed by an ECP parser. Such a file can be formatted according to an agreed standard, such as ANSI X9.37 2003, a well-known standard within the banking industry promulgated by the American National Standards Institute (ANSI). Such a format typically includes header records, detail records, and control records. CIFF files are parsed by a CIE archive (CIEA) parser. This parser can create an index file based on the information in the CIFF file. This index information can be included in a file detail table. In such a case, the file detail table containing the index details is stored in the II database, 228. In this case, II database 228 contains all the indexed field values for all of the index detail records separated by delimiters. The order of the records can be dictated by the capture bank. Similarly, an indexing reference file can be parsed by an indexing reference file parser.

Cross-reference files are parsed according to a cross-reference file format. Cross-reference files and some example formats for such files will be discussed in detail later in this disclosure. Daemon process 208 instantiates any necessary parsing process to parse the files. Matching component 212 uses unique handles from the files as arguments in order to check for the existence of image records and match the image records with the unique handles.

In the example of FIG. 2, retrieval process 220 retrieves images from the exchange zone, 236. A retrieval process could also retrieve images from elsewhere in the storage layer. These images are retrieved by the paying bank for reconciliation. The images may also be retrieved for future reference by the capture bank. Retrieval process 220 can use media manager application programming interfaces. Various mechanisms can be provided to render images to a bank for retrieval. In some embodiments, an adhoc layer based on extensible mark up language (XML) web server technology is created and a bank can access the images via a VPN connection using standard web type interfaces. Communication in such a case is directly from firewall 202 to the other layers of the system as shown by communication link 244. A batch mode can also be provided where items are placed in landing zone 204 for retrieval by a bank. It is also possible to set up a system that provides a choice of these two and possibly other retrieval methods to a customer bank on a case-by-case basis.

Loading process 214 creates generic index files for loading into the folders in OnDemand archive 236. As previously discussed, files can be stored in the archive in some embodiments, in a MODCA format. In MODCA, an "out" file contains the images, and an index file contains data for locating the images and matching them up to index information contained in II database 228. Thus, the standard MODCA format actually specifies two files. Also as previously mentioned, TIFF wrappers can be used.

Figure 3A:
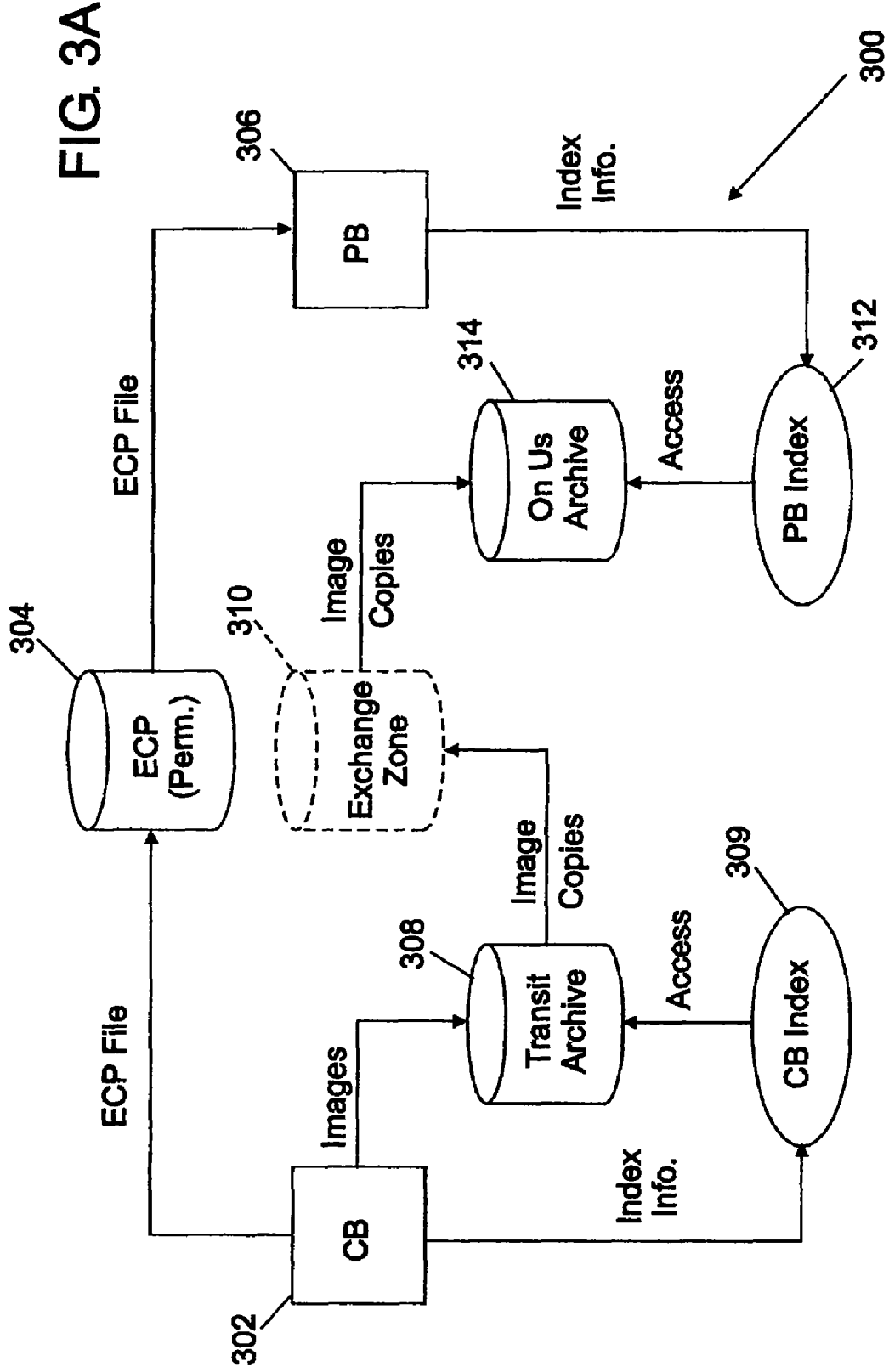
FIG. 3 presents block diagrams, which illustrate storage architecture for images according to two embodiments of the invention. These two diagrams are further designated FIG. 3A and FIG. 3B.
Figure 3B:
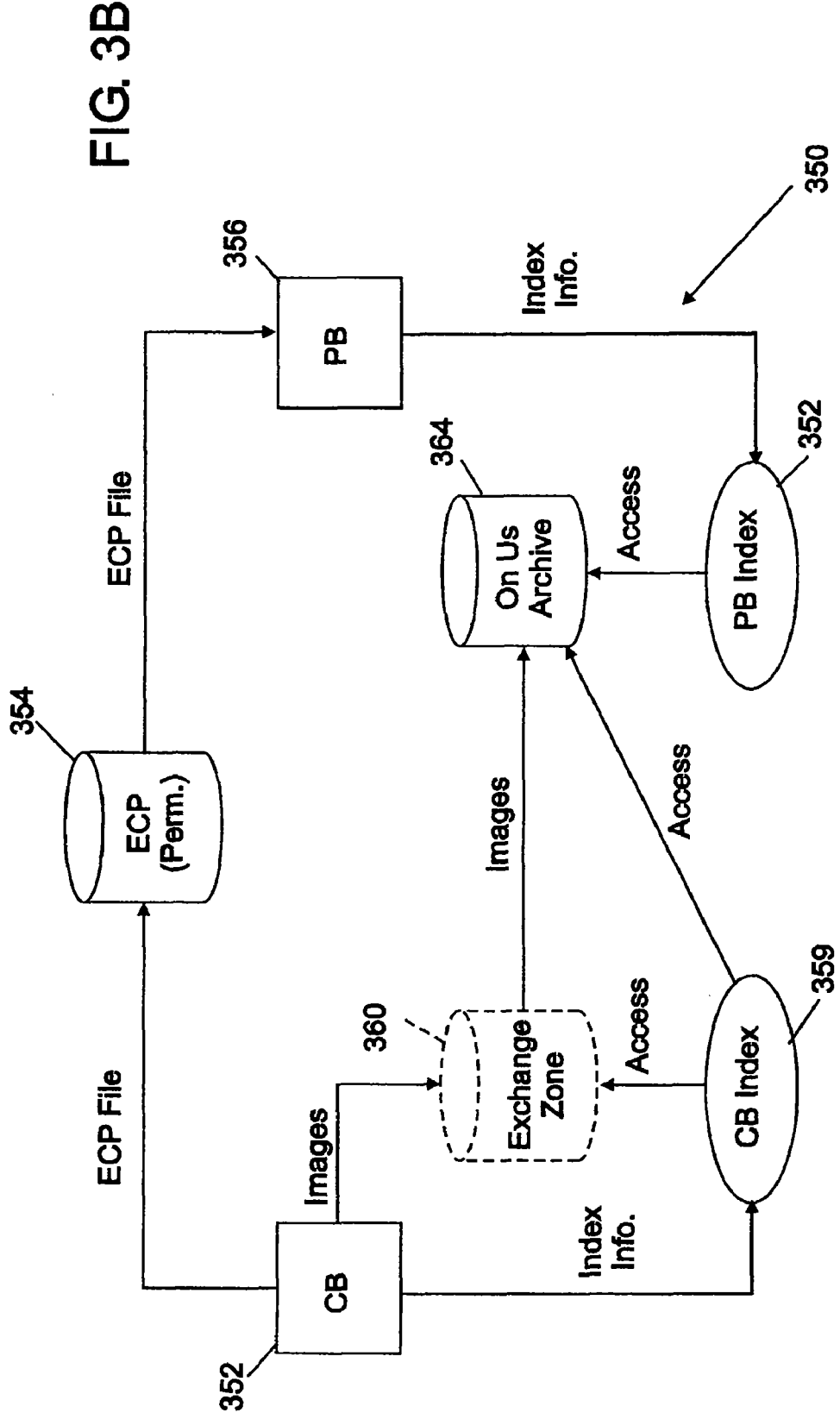

FIG. 3 illustrates how images and data are transferred to and from, and managed within a substantially centralized storage system according to some embodiments of the invention. FIG. 3A illustrates the process and database structures where separate archives are maintained for the capture bank and the paying bank. FIG. 3B illustrates the process and database structure where one copy of an image is maintained for access by both banks. It is important to recognize that these are not mutually exclusive embodiments. A single service provider utilizing the invention to provide archiving services can offer both systems. Indeed, some banks may prefer to have their own separate copy of transit items, while others may prefer to take advantage of reduced storage requirements and hence cost by sharing copies of items. Thus, FIG. 3 is presented as two different views showing possibly concurrent processes and structures. Of course, a service provider can restrict itself to one methodology or the other, or combine either one or both methodologies with still other systems or techniques.

In FIG. 3A, capture bank (CB) 302 sends an ECP file to system 300 via a network. ECP information is copied to permissions database (perm.) 304. The paying bank (PB), 306, can retrieve the ECP file and queue it for its normal internal processing. At some point, capture bank 302 sends a load file containing the images referenced by the ECP file. The images are loaded into transit archive 308. Index information from the load file is used to create a capture bank index, 309, which is used to manage access to the transit archive. Copies of images are loaded into exchange zone 310. Exchange zone 310 serves as temporary storage until a cross-reference file is received from the paying bank, 306. Paying bank 306 then sends index information, in example embodiment in the form of the cross-reference file, after processing the ECP file against its account records. The index information in the cross-reference file is used to populate paying bank index 312. This information is then used to load the appropriate images from exchange zone 310 into the paying bank's on us archive, 314. Once the process is complete, the images can optionally be deleted from exchange zone 310. The capture bank index controls access to the capture bank's image copies in the transit archive, 308, and the paying bank index controls access to the paying bank's image copies in the on us archive, 314.

In FIG. 3B, capture bank (CB) 352 sends an ECP file to system 350 via the network. ECP information is copied to permissions database (perm.) 354. The paying bank (PB), 356, will receive the ECP file and queue it for its normal internal processing. Arrangements can be made to have a copy of the ECP forwarded to the paying bank on the capture bank's behalf, or it can be sent directly from the capture bank to the paying bank via external means. At some point, capture bank 352 sends a load file containing the images referenced by the ECP file. Index information in the load file is used to create capture bank index 359. The images are stored in exchange zone 360 temporarily. Images can be retrieved from there for use by paying bank 352 if necessary. Paying bank 356 then sends index information, in example embodiments in the form of the cross-reference file, after processing the ECP file against its account records. Since images are to be shared in this case, the cross-reference file can also be referred to as a shared index file. The index information in this file is used to populate paying bank index 362. This information is then used to load the appropriate images from exchange zone 360 into the on us archive, 364. Once the process is complete, the images can optionally be deleted from exchange zone 360. The capture bank index controls the capture bank's access to the images, and the paying bank index controls the paying bank's access to the images in on us archive 364. However, there is only a single image of each item, which is shared by paying bank 356 and capture bank 352. Provisions can be made to verify the indexes against the permissions database, and to check the capture bank index against values provided in the paying bank index, or check both indexes against the shared index file. Reconciliation reports can be generated to enable any mismatches or similar problems to be corrected. Provisions can be made to delete the shared index file once the indexes and archive are established, or at the end of a specified retention period.

Figure 4:
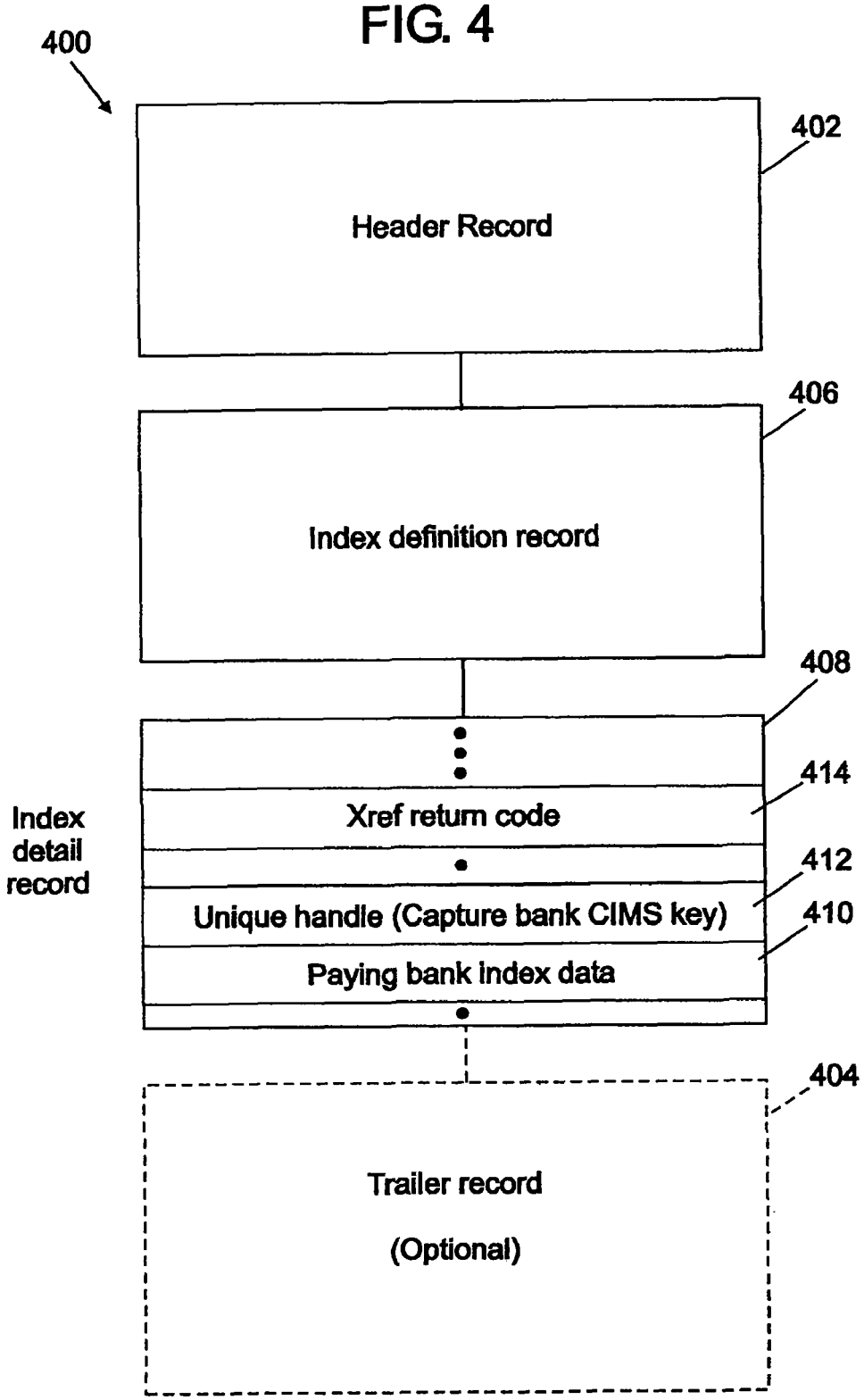
FIG. 4 is a schematic representation of an index record as contained in a cross-reference file according to some example embodiments of the invention.

FIG. 4 provides a schematic illustration of a portion of the structure of a cross-reference file according to some embodiments of the invention. FIG. 4 shows an index record, 400, including a header record 402 and an optional trailer record 404. Index definition record 406 provides a definition of the record type, the record length, and definitions of other information that supports and/or enables check clearing and/or check collection, which can include any paying bank specific index data which are contained in the index record. Index detail record 408 includes any actual paying bank specific index data, as shown at 410. This paying bank specific index data can include, by way of example, items such as routing numbers, transit numbers, dates, and check serial numbers. Index detail record 408 also includes a unique handle, 412, for the referenced check image. The unique handle, 412, can be the capture bank CIMS key value which was created when the check was scanned at the capture bank. In this case, the key value includes a date code and sequence number concatenated together. Index detail record 408 also includes a cross-reference return code, 414, which can also be called a shared index return code. In example embodiments, cross-reference return code 414 is inserted into the cross-reference file to provide an image status record for use by the storage system and by the financial institutions. The return code value can be used to indicate whether an image is available, in what form the image is available, if the image is missing, poor quality, or only available in the bulk archive. In cases where the image is not available, a paying bank may desire to substitute their own image for one, which would have been received from the capture bank. This may be possible if paper checks are still forwarded from the capture bank to the paying bank as a final supplement to use of the substantially centralized storage system of the present invention. However, normally the image will be present at the substantially centralized system, and the unique handle contained in the index detail record will identify the check image so that it is accessible to both the paying bank and the capture bank. In some embodiments, the paying bank may insert its own CIMS key into cross-reference file index detail record 408. The capture bank's CIMS key may be used for tracking purposes within the paying bank, essentially treating the image as if it had been "scanned" by the paying bank in the manner of the prior art.

Additional details on the structure of an example cross-reference file can be garnered by reference to the cross-reference index record definition tables, below.

Header Record 402

| Field | Field Length | Field Type | Comments |
| --- | --- | --- | --- |
| Record type | 1 | Char | Value = "H" |
| Sending bank ID | 3 | Char | Bank identifier, also used for the image loading process |
| Paying bank ID | 3 | Char | Bank identifier, also used for the image loading process |
| Date | 8 | Char | Yyyymmdd |
| Cash Letter ID | 6 | Char | 6 characters if present |

Index Definition Record 406

| Field | Length | Field Type | Comments |
|---|---|---|---|
| Record type | 1 | Char | Value = "I" |
| Reserved | 1 | Char | Not Used - blank filled |
| Record version | 1 | Char | Record Format Version, Value = 1 |
| Reserved | 1 | Char | Not Used - blank filled |
| Reserved | 4 | Char | Not Used - blank filled |
| Reserved | 23 | Char | Not Used - blank filled |
| Length | 5 | Char | Length of the index records in bytes |
| Paying bank specific index definition record data | Variable | Group | Format described in the following table. |

The name and format for each field in index definition record 406 in an example embodiment is as follows:

The following fields are repeated for each index field.

| FIELD | TYPE | LENGTH | DESCRIPTION |
|---|---|---|---|
| CDFLDNAM | Char | 11 | Index field name |
| CDFLDTYP | Char | 1 | Index field data type (C, N, D) C = Character N = Numeric (0-9) D = Date (YYYYMMDD) |
| Reserved | Char | 4 | Not used - blank filled |
| CDFLDLEN | Char | 4 | Index field length in number of bytes |
| CDFLDDEC | Char | 2 | Field decimal count. The number of decimal positions to the right of the decimal point in the field. |
| Reserved | Char | 10 | Not Used - blank filled |

The following fields follow the index field definitions

| | | | |
|---|---|---|---|
| CDTERM | Char | 1 | Not used - blank filled |
| | Char | 27 | Not used - blank filled |

Index Detail Record 408

| Field | Length | Field Type | Comments |
|---|---|---|---|
| Record type | 1 | Char | Value = 'D' |
| Reserved | 1 | Char | Not used - blank filled |
| Record version | 1 | Char | Record format version, Value = 1 |
| Xref return code | 1 | Char | This value inserted by the centralized storage system with the results of the cross-reference update. Possible example values: U = image available at paying bank V = image archive and microfilm available at paying bank S = indicates missing image, poor quality image or other problems with document. T = image available only at centralized storage system |
| Reserved | 4 | Char | Not used - blank filled |

| Field | Length | Field Type | Comments |
|---|---|---|---|
| Capture bank CIMS key | 20 | Char | CIMS key in the format yyyymmddssnnnnnnnnncc |
| Paying bank CIMS key | 20 | Char | CIMS key in the format yyyymmddssnnnnnnnnncc |
| Paying bank specific index data | Var | | Index Data (formatted as defined in the Index Definition Record above) |

Trailer Record 404

| Field | Length | Field Type | Comments |
|---|---|---|---|
| Record type | 1 | Char | Value = 'T' |
| Index Record Count | 6 | Char | Total number of Index Detail Records (Type 'D') contained in the file. |

Referring to the above tables, most of the field information is self-explanatory. Note that CIFF files contain an index definition record and index detail record, although not necessarily of the same format as those illustrated above. CIFF files to not contain header and trailer records. Nevertheless, some of the fields are populated with information that is similar to that contained in CIFF and other banking files. Note in particular that as an arbitrary design choice, reserved fields of the same length as those in CIFF files are inserted.

The unique handle, 412, which in this example is the same as the capture bank CIMS key is part of index detail record 408 of the cross-reference file. The record types for the above shown records are "H" for a header record, "I" for an index definition record, "D" for an index detail record, and "T" for a trailer record. The record version field is in place to show what version of the format of the particular record of the cross-reference file is in use. What version numbering scheme to use is an arbitrary engineering decision. In this example, the version is simply given the number "1" and so that value has been inserted.

Those of skill in the art will recognize that the cross-reference file format illustrated above is based on the industry standard X9.37 file format for ECP files. Such files use EBCDIC character sets. The same information can also be conveyed in a cross-reference file using ASCII character sets by basing the cross-reference file format on the previously discussed indexing reference file format. Any type of file can be used as a cross-reference file, as long as it contains the fields, which enable an embodiment of the invention as discussed herein. The file can follow any format as long as the parties agree on the format.

As further illustration, if the cross-reference file is based on the indexing reference file format, a bank can supply a parameter file that contains one or more sets of instructions, each set identifying the On Us index values for the image to be loaded to the archive. All sets of instructions contained within the parameter file apply to a single application group and to a single collecting bank. Each set of instructions includes both the unique handles that identify the shared or exchanged image and the On Us index values to be associated with the image in the archive.

With the indexing reference based format, the unique handles that identify the shared/exchanged image can consist of the sequence number and capture date of the item. These values were provided by the collecting bank, for example in the ECP file. The On Us index values are also specified in the parameter file. These values will be used to load the shared/exchanged image into the archive.

As an example, update instructions can follow the following form. The UNIQUE_FIELD_NAME and UNIQUE_FIELD_VALUE below identify the unique handles for the images supplied by the collecting bank. The remainder of each set of instructions supplies the On Us index values for the image.

An more detailed example of how an indexing reference based cross-reference file can specify sequence numbers and dates is as follows, where CB is for "capture bank," acct_nbr specifies an account number and nines are used for example field values. Each parameter file may contain one of more sets of instructions for a single application group.

UNIQUE_FIELD_NAME: CB_sequence_number (1)
UNIQUE_FIELD_VALUE: 99999999
UNIQUE_FIELD_NAME: CB_capture_date (1)
UNIQUE_FIELD_VALUE: mm/dd/yyyy (2)
GROUP_FIELD_NAME: sequence_number
GROUP_FIELD_VALUE: 99999999
GROUP_FIELD_NAME: capture_date
GROUP_FIELD_VALUE: mm/dd/yyyy
GROUP_FIELD_NAME: acct_nbr
GROUP_FIELD_VALUE: 99999999
GROUP_FIELD_NAME: post_acct_nbr
GROUP_FIELD_VALUE: 99999999

Figure 5:
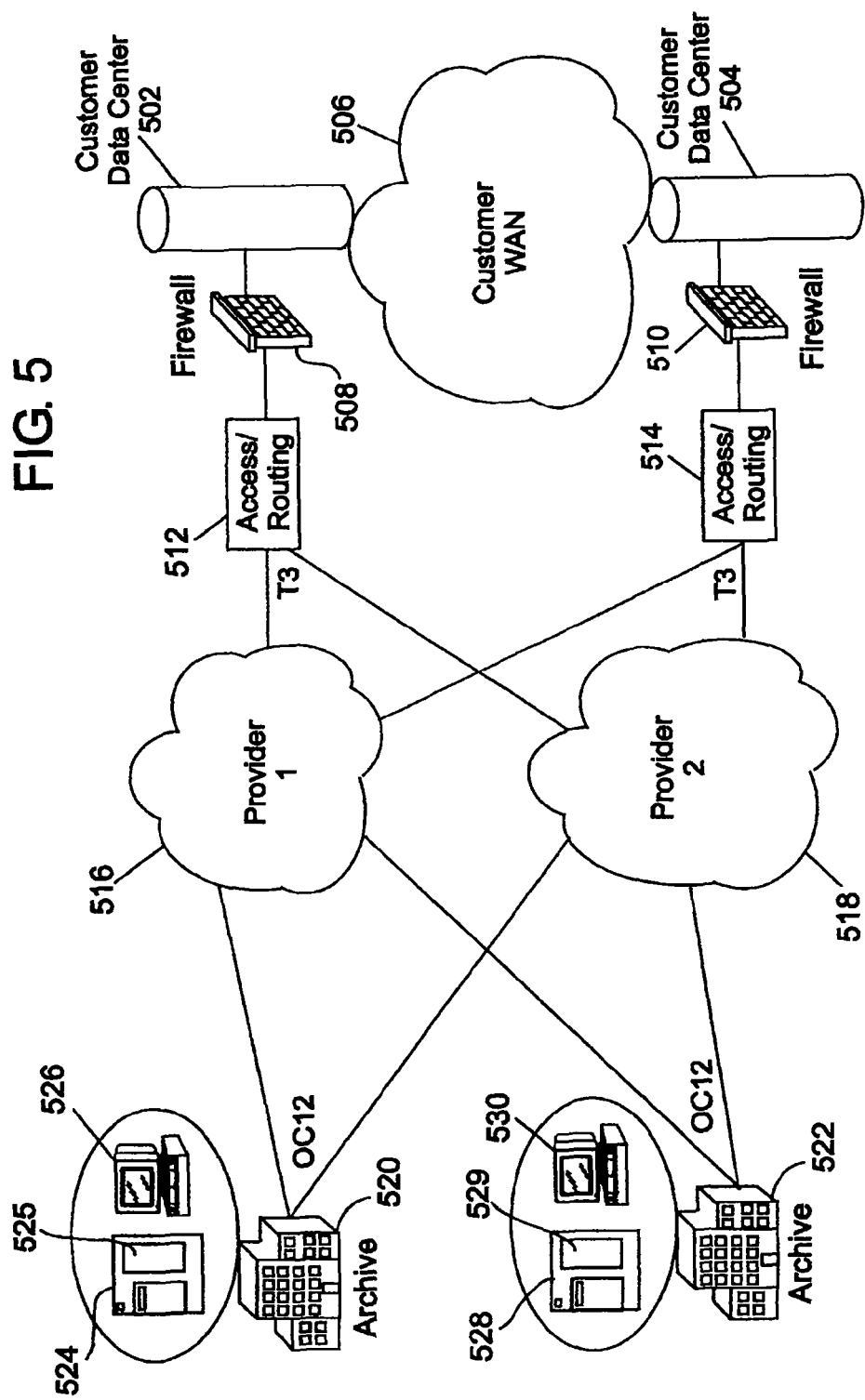
FIG. 5 is a network block diagram that illustrates the operating environment of some embodiments of the invention.

FIG. 5 illustrates a typical operating environment for a centralized storage system according to example embodiments of the invention. At one end of FIG. 5 are the facilities of a customer bank or financial institution, in most cases, either a paying bank or a capture bank. In an actual network, multiple customer institutions access the centralized storage system over the networks using similar data centers and connections. Only one customer bank facility is shown in FIG. 5 for clarity. Due to the mission critical nature of the data processing and imaging facilities at a financial institution, most banks and similar financial institutions use redundant data centers. In the example of FIG. 5, customer data centers 502 and 504 are interconnected via a customer wide area network (WAN), 506. Each data center, 502 and 504, has access to external networks via firewalls, 508 and 510, and access and routing hardware, 512 and 514, as is known in the art. Customer data center network access is provided via T3 connections in this example. Due to the previously mentioned mission critical nature of financial institution networking and data processing services, customer financial institutions may be connected to the centralized storage system via redundant provider networks, 516 and 518. These networks in this example are operated by "Provider 1" and "Provider 2," respectively. Both networks 516 and 518 can use the resources of the Internet for connectivity. However, each one will provide its own VPN connection or "pipe" to the customer data centers, 502 and 504. Typically, highly secure encryption such as so-called "triple DES" encryption will be used at access and egress levels for the networks.

A centralized storage system according to some embodiments of the invention can include two or more physical storage locations, such as storage locations 520 and 522. Since in a typical environment, these locations will be serving many banks, faster optical carrier connections can be used to interface the locations to a network. In the example of FIG. 5, optical carrier 12 (OC12) connections are used. Any other type of high-volume, high speed connection can be used, for example, OC48 or OC192 connections. In any case, a centralized storage system according to embodiments of the invention will include all of the computer systems, local networking hardware, storage devices, etc. to form the means to carry out the processes involved in providing images to banks from a substantially centralized storage system.

As previously mentioned, computer program instructions may be used to implement all or parts of the present invention. In a typical arrangement, computer program instructions running on various computing or instruction execution platforms within locations 520 and 522 of FIG. 5 will carry out the various operations required to implement processes according to embodiments of the invention. These computer program instructions may be part of a computer program or multiple computer programs which are supplied as a computer program product. In such a case, the computer program product may take the form of computer readable media that allow computer program instructions to be loaded into various servers or other computing platforms to implement the invention. In the example operating environment of FIG. 5, a computer program product in the form of a medium containing the appropriate computer program instructions is shown as medium 524 containing instructions 525 which are then loaded onto server 526 residing at location 520. Similar computer program instructions which implement embodiments of the invention reside on medium 528 containing instructions 529 which is then loaded onto server 530 which resides at location 522.

In addition to being supplied in the form of a machine-readable medium or machine-readable media, computer program instructions which implement the invention can also be supplied over a network. In this case, the medium is a stream of information being retrieved when the computer program product has downloaded. Computer programs which implement embodiments of the invention can reside on any medium that can contain, store, communicate, propagate, or transport the program for use by or in connection with any instruction execution system, apparatus, or device. The medium may be for example but not limited to, an electronic, magnetic, optical, electromagnetic, infrared, or semiconductor system or device. Such media include compact disk, read only memory (CD-ROM), and digital versatile disk read only memory (DVD-ROM). Note that a computer usable or computer readable medium could even be paper or another suitable medium upon which the program is printed, as the program can be electronically captured, via, for instance, optical scanning of the paper or other medium, and then processed in a suitable manner.

Embodiments of the present invention support and enable an electronic check collection and clearing process, so that an image can be used to represent a paper check throughout the collection process, and the movement of paper checks can be eliminated. The elimination of paper checks is referred to in the banking industry as "truncation." Some truncation already exists in that many banks no longer provide paper copies of cancelled checks to account holders, but rather supply only electronic images. A process where paper checks are truncated in the collection phase starts with the account holder writing a paper check that is presented to a capture bank/institution that converts the paper check to an image using standard high-speed or low-speed image capture devices. In advance, the paying bank, by agreement, provides required file detail to the capture bank, either directly or through an agent. Alternatively, the agreement as to this detail can be arranged by the operator of the image sharing storage system that is the subject of this application. The capture bank uses this file detail to electronically and/or physically sort the items to be truncated. Special agreements between capture and paying banks regarding this process could be eliminated in the future if legislation or standards were to be adopted to authorize banks to truncate checks in the collection process.

In the example embodiments presented, the capture bank can use the information provided by the paying bank to create an electronic cash presentment (ECP) file that is distributed to either a clearing agent designed to support the distribution of these cash letters between banks or directly to the receiving bank. The capture bank, in some embodiments of the invention can also send the ECP file to the centralized storage system as described herein. The paying bank may retrieve the ECP file from there rather than receive a separate copy from the capture bank or an agent. Alternatively, or in addition, the ECP file can be used by the centralized storage system for error checking, statistical tracking, etc.

The paying bank, in example embodiments, uses the ECP file to prepare the cross-reference file identifying the transactions and the electronic items to be retrieved from the image sharing, centralized storage system for posting and acceptance by the paying bank. The paying bank can use the electronic images and index information instead of the paper checks to finally post the transactions, conduct fraud and signature verification processes and perform an exception item pull process for those transactions requiring additional handling. Completed transactions are then ready for any statement generation process that is performed by the paying bank. Electronic checks that are identified as return items can be prepared for distribution back to the capture bank. These images can be returned directly by agreement between banks, sent through a clearing agent or processor, or by other means.

Specific embodiments of an invention are described herein. One of ordinary skill in the computing, networking, and financial information technology arts will quickly recognize that the invention has other applications and other environments. In fact, many embodiments and implementations are possible. The following claims are in no way intended to limit the scope of the invention to the specific embodiments described above.

What is claimed is:

1. A method of centralizing images of documents evidencing financial transactions for access by at least two financial institutions, the method comprising:
    receiving at a substantially centralized computer system an image of a document evidencing a financial transaction from a financial institution where the image has been captured;
    storing the image in a data store in the substantially centralized computer system;
    acquiring at the substantially centralized computer system a file defining operating parameters for at least one of the financial institutions;
    parsing by the substantially centralized computer system the file by referring to a database of specific index values to build an institution specific index to the image of the document evidencing the financial transaction in the substantially centralized computer system; and
    rendering from the substantially centralized computer system the image to each of the at least two financial institutions as necessary at least in part based on the institution specific index so that the image of the document evidencing the financial transaction is accessible by both the financial institutions from the substantially centralized computer system.

2. The method of claim 1 wherein the file is a cross-reference file and the database is a profiling database.

3. The method of claim 2 wherein the cross-reference file is acquired from a receiving institution.

4. The method of claim 3 wherein the cross-reference file further comprises check image management system (CIMS) keys.

5. The method of claim 1 wherein the rendering of the image further comprises reading the image by the substantially centralized computer system from a first storage area for use by one financial institution, and reading the image by the substantially centralized computer system from a second storage area for use by the other financial institution.

6. The method of claim 2 wherein the rendering of the image further comprises reading the image by the substantially centralized computer system from a first storage area for use by one financial institution, and reading the image by the substantially centralized computer system from a second storage area for use by the other financial institution.

7. The method of claim 3 wherein the rendering of the image further comprises reading the image by the substantially centralized computer system from a first storage area for use by one financial institution, and reading the image by the substantially centralized computer system from a second storage area for use by the other financial institution.

8. The method of claim 4 wherein the rendering of the image further comprises reading the image by the substantially centralized computer system from a first storage area for use by one financial institution, and reading the image by the substantially centralized computer system from a second storage area for use by the other financial institution.

9. The method of claim 1 wherein the rendering of the image further comprises reading the image by the substantially centralized computer system from the same storage area for use by both the financial institutions.

10. The method of claim 2 wherein the rendering of the image further comprises reading the image by the substantially centralized computer system from the same storage area for use by both the financial institutions.

11. The method of claim 3 wherein the rendering of the image further comprises reading the image by the substantially centralized computer system from the same storage area for use by both the financial institutions.

12. The method of claim 4 wherein the rendering of the image further comprises reading the image by the substantially centralized computer system from the same storage area for use by both the financial institutions.

13. Apparatus for centralizing images of documents evidencing financial transactions for access by at least two financial institutions, the method comprising:
    means for receiving an image of a document evidencing a financial transaction from a financial institution where the image has been captured;
    means for storing the image in a substantially centralized computer system;
    means for acquiring a file defining operating parameters for at least one of the financial institutions;
    means for parsing the file by referring to a database of specific index values to build an institution specific index to the image of the document evidencing the financial transaction in the substantially centralized computer system; and
    means for rendering the image to each of the at least two financial institutions as necessary at least in part based on the institution specific index so that the image of the document evidencing the financial transaction is accessible by both the financial institutions from the substantially centralized computer system.

14. The apparatus of claim 13 wherein the file is a cross-reference file and the database is a profiling database.

15. The apparatus of claim 14 wherein the cross-reference file is acquired from a receiving financial institution.

16. The apparatus of claim 15 wherein the cross-reference file further comprises check image management system (CIMS) keys.

17. The apparatus of claim 13 wherein the means for rendering the image further comprises:
   means for reading the image from a first storage area for use by one financial institution; and
   means for reading the image from a second storage area for use by the other financial institution.

18. The apparatus of claim 14 wherein the means for rendering the image further comprises:
   means for reading the image from a first storage area for use by one financial institution; and
   means for reading the image from a second storage area for use by the other financial institution.

19. The apparatus of claim 15 wherein the means for rendering the image further comprises:
   means for reading the image from a first storage area for use by one financial institution; and
   means for reading the image from a second storage area for use by the other financial institution.

20. The apparatus of claim 16 wherein the means for rendering the image further comprises:
   means for reading the image from a first storage area for use by one financial institution; and
   means for reading the image from a second storage area for use by the other financial institution.

21. The apparatus of claim 13 wherein the means for rendering of the image further comprises means for reading the image from the same storage area for use by both the financial institutions.

22. The apparatus of claim 14 wherein the means for rendering of the image further comprises means for reading the image from the same storage area for use by both the financial institutions.

23. The apparatus of claim 15 wherein the means for rendering of the image further comprises means for reading the image from the same storage area for use by both the financial institutions.

24. The apparatus of claim 16 wherein the means for rendering of the image further comprises means for reading the image from the same storage area for use by both the financial institutions.

25. A computer program storage product embodying executable computer program code stored in a non-transitory computer readable medium for centralizing images of documents evidencing financial transactions for access by at least two financial institutions, wherein the computer program code, when executed by a computer causes the computer to perform a method comprising:
   receiving an image of a document evidencing a financial transaction from a financial institution where the image has been captured;
   storing the image in a substantially centralized computer system;
   acquiring a file defining operating parameters for at least one of the financial institutions;
   parsing the file by referring to a database of specific index values to build an institution specific index to the image of the document evidencing the financial transaction in the substantially centralized computer system; and
   rendering the image to each of the at least two financial institutions as necessary at least in part based on the institution specific index so that the image of the document evidencing the financial transaction is accessible by both the financial institutions from the substantially centralized computer system.

26. The computer program storage product of claim 25 wherein the file is a cross-reference file and the database is a profiling database.

27. The computer program storage product of claim 26 wherein the cross-reference file is acquired from a receiving financial institution.

28. The computer program storage product of claim 27 wherein the cross-reference file further comprises check image management system (CIMS) keys.

29. The computer program storage product of claim 25 wherein the rendering of the image further comprises reading the image from a first storage area for use by one financial institution, and reading the image from a second storage area for use by the other financial institution.

30. The computer program storage product of claim 26 wherein the rendering of the image further comprises reading the image from a first storage area for use by one financial institution, and reading the image from a second storage area for use by the other financial institution.

31. The computer program storage product of claim 27 wherein the rendering of the image further comprises reading the image from a first storage area for use by one financial institution, and reading the image from a second storage area for use by the other financial institution.

32. The computer program storage product of claim 28 wherein the rendering of the image further comprises reading the image from a first storage area for use by one financial institution, and reading the image from a second storage area for use by the other financial institution.

33. The computer program storage product of claim 25 wherein the rendering of the image further comprises reading the image from the same storage area for use by both the financial institutions.

34. The computer program storage product of claim 26 wherein the rendering of the image further comprises reading the image from the same storage area for use by both the financial institutions.

35. The computer program storage product of claim 27 wherein the rendering of the image further comprises reading the image from the same storage area for use by both the financial institutions.

36. The computer program storage product of claim 28 wherein the rendering of the image further comprises reading the image from the same storage area for use by both the financial institutions.

37. A central system for centralizing images of documents evidencing financial transactions for access by at least two financial institutions, the system comprising:
   a landing zone configured to receive files, the files further comprising an image of a document evidencing a financial transaction from a financial institution where the image has been captured, and a file defining operating parameters for at least one of the financial institutions;
   a storage layer configured to store the image and databases in the central system, the databases further comprising a database of specific index values provided by at least one of the financial institutions; and
   a computer configured to execute instructions to parse the file by referring to the database of specific index values to build an institution specific index to the image of the document evidencing the financial transaction in the central system, and to render the image to each of the at least two financial institutions as necessary at least in part based on the institution specific index so that the image of the document evidencing the financial transaction is accessible by both the financial institutions from the central system.

38. The central system of claim 37 wherein the file is a cross-reference file and the database is a profiling database.

39. The central system of claim 38 wherein the cross-reference file further comprises check image management system (CIMS) keys.

40. The central system of claim 38 wherein the databases further comprise an information interchange database.

41. The central system of claim 40 wherein the databases further comprise a permissions database created using an electronic cash presentment (ECP) file.

* * * * *